(12) United States Patent
Linares et al.

(10) Patent No.: US 6,246,560 B1
(45) Date of Patent: Jun. 12, 2001

(54) PERIPHERAL DEVICE ISOLATOR

(75) Inventors: Ignacio A. Linares, Plano; Donald H. Topper, III, Van Alstyne; Dale L. Reynolds, Krugerville, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/288,770

(22) Filed: Apr. 8, 1999

(51) Int. Cl.[7] ..................................................... H02H 7/00
(52) U.S. Cl. ............................ 361/119; 361/753; 361/799
(58) Field of Search .................................. 174/50, 51, 56, 174/52.1; 361/753, 126, 760, 119, 799, 118, 111, 117, 127, 212; 333/12

(56) References Cited

U.S. PATENT DOCUMENTS 4,958,255 * 9/1990 Pritchard ............................... 361/212
5,786,974 * 7/1998 Zaretsky ................................ 361/107

* cited by examiner

Primary Examiner—Ronald W. Leja
(74) Attorney, Agent, or Firm—Baker Botts L.L.P.

(57) ABSTRACT

A peripheral device isolator (32) is provided which consists of an insulating material (33) having a first conductive area (34) on a top surface and a second conductive area (35) on a bottom surface. A transient voltage suppressor (36) provides an electrical connection between the first conductive area (34) and second conductive area (35) through a first lead (38) and a second lead (40). When the peripheral device isolator (32) is placed between an internal peripheral device (12), having a common logic and chassis ground, and a host frame (10), having a host system frame ground (16), an electrical path for a voltage spike occurring on the internal peripheral device (12) is provided so that the voltage spike can be diverted away from host system logic ground (22) and into host system frame/safety ground (16). Under normal circumstances, the transient voltage suppressor (36) is in a non-conductive state so that the separation of the host system logic ground (22) and the host system frame/safety ground (16) is maintained. The transient voltage suppressor (36) is in a conductive state only upon sensing a voltage spike on the chassis of the internal peripheral device (12).

14 Claims, 2 Drawing Sheets

PERIPHERAL DEVICE ISOLATOR

TECHNICAL FIELD OF THE INVENTION

This invention relates in general to the field of grounding of electrical signal processing systems and more particularly to a peripheral device isolator.

BACKGROUND OF THE INVENTION

Manufacturers of telecommunications processing system devices utilize isolated or integrated grounding schemes to comply with Bellcore. Telecom grounding schemes isolate Frame/Chassis/Safety ground from power ground.

Computer systems and peripherals have traditionally used a single common logic and chassis ground. Thus, all logic components and the chassis enclosing the logic components are connected to a common ground. Chassis components also include the cases of peripheral devices such as tape drives and CD-ROM drives. Therefore, a transient voltage on the device chassis may enter the internal logic components as the transient voltage travels to the single integrated logic and chassis ground. The transient voltage can cause system interruption and damage. A transient voltage such as ESD commonly occurs with devices requiring human interaction. The human body has an electrostatic potential which may discharge upon touching the device. This discharge can be up to 15,000 volts applied directly to the device causing a transient voltage spike which will follow the path of least resistance to a ground. If the electrostatic discharge or any other transient surge occurs on a computer device, such as a CD-ROM drive or a tape drive, the voltage spike follows the path of least resistance to the single common logic and chassis ground. This path could flow through logic components which could be interrupted or damaged due to the voltage spike.

Manufacturers of telecommunications processing devices and systems desire to use computer peripherals in the design of their systems. However, this presents a grounding problem since computer peripherals use a common logic and chassis ground. Some manufacturers of telecommunications processing systems mount computer peripherals in their systems, isolating the computer peripheral from the host system frame using some form of non-conducting isolators. This maintains the separation of the host system logic and frame grounds. However, if the computer peripheral requires human interaction, a transient voltage spike may occur on the computer peripheral. Therefore, the resulting voltage spike would travel through the computer peripheral chassis to the host system logic ground since the computer peripheral's common integrated logic and chassis ground is attached to the host system logic ground. Thus, the voltage spike would enter the host system logic ground which could result in the voltage spike entering logic components thereby causing interruptions or damages to those components.

Due to the aforementioned problems, it is desirable to provide a ground isolation technique that allows for the implementation of computer peripheral devices in a telecommunications system.

SUMMARY OF THE INVENTION

From the foregoing, it may be appreciated that a need has arisen for a peripheral device isolator that allows computer peripheral devices to be incorporated into a telecommunications system. In accordance with the present invention, a system and method for isolating a peripheral device and protecting the host system from a transient voltage on the peripheral device is provided which substantially eliminates or reduces disadvantages or problems associated with using computer peripheral devices in telecommunications systems.

According to one embodiment of the present invention, there is provided a peripheral device isolator which is capable of isolating a peripheral device from a host system frame and diverting transient voltages on the peripheral device into the host system frame. The peripheral device isolator is constructed of an insulating material with a conductive area on each of two opposite sides. These conductive areas are connected to each other via a transient voltage suppression device.

According to another embodiment of the present invention, there is provided a processing system which has a system frame with a frame ground, chassis components with a chassis ground, and a plurality of logic components which are grounded to a separate logic system ground. Peripheral devices having an integrated chassis and logic ground used in the processing system are isolated from the system frame with a peripheral device isolator which has a transient voltage suppressor. The Peripheral Device Isolator connects the peripheral device chassis to the system frame. This electrical signal path allows a transient voltage spike on the peripheral device chassis to travel into the system frame and, thus, into the frame ground. This prevents the transient voltage spike from entering the plurality of logic components either within the peripheral device chassis or within the host system logic ground and causing interruptions or damages.

The present invention provides various technical advantages over conventional device isolation techniques. For example, one technical advantage is to provide an electrical signal path from the peripheral device chassis to the host system frame so that transient voltage spikes can travel from the peripheral device chassis directly into the host system frame ground without affecting any logic components within the peripheral device chassis or the host system. Another technical advantage is to implement a peripheral device isolator to allow incorporation of computer peripheral devices into a telecommunications system. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like references or reference numbers represent like parts, in which.

DETAILED DESCRIPTION OF THE DRAWINGS

Figure 1:
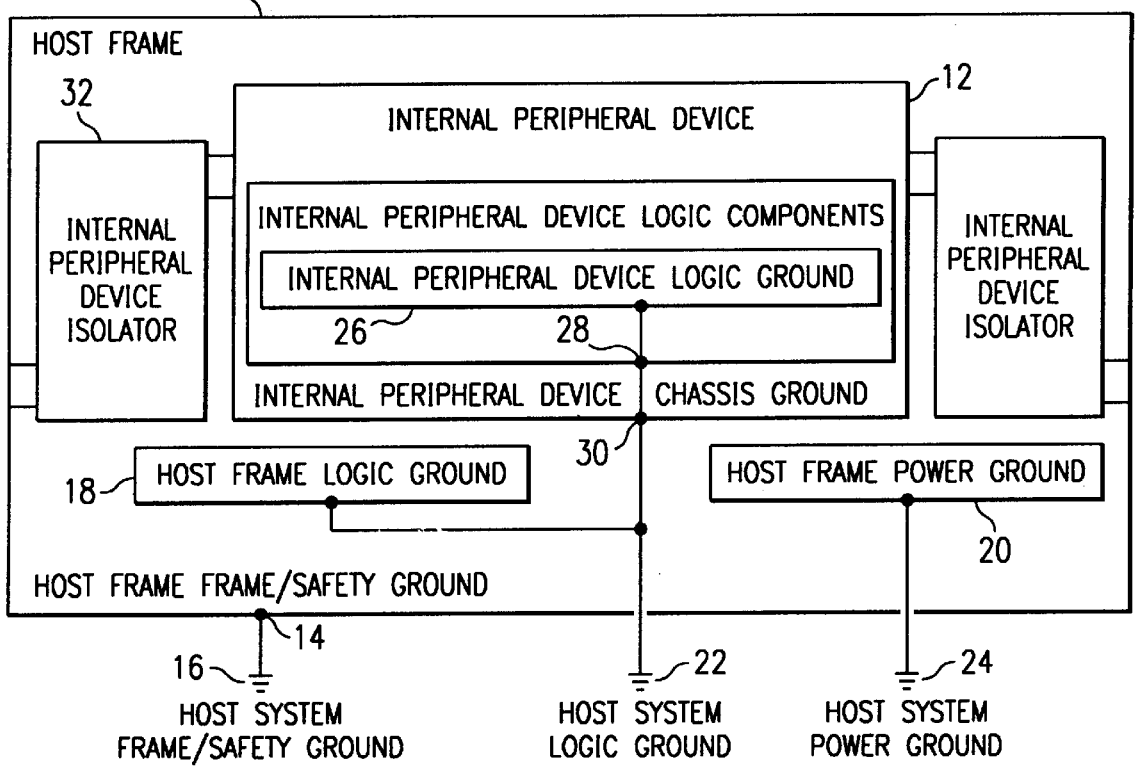
FIG. 1 is a block diagram illustrating the use of an internal peripheral device isolator in an isolated ground configured host system frame with an integrated ground configured internal peripheral device.
Figure 2:
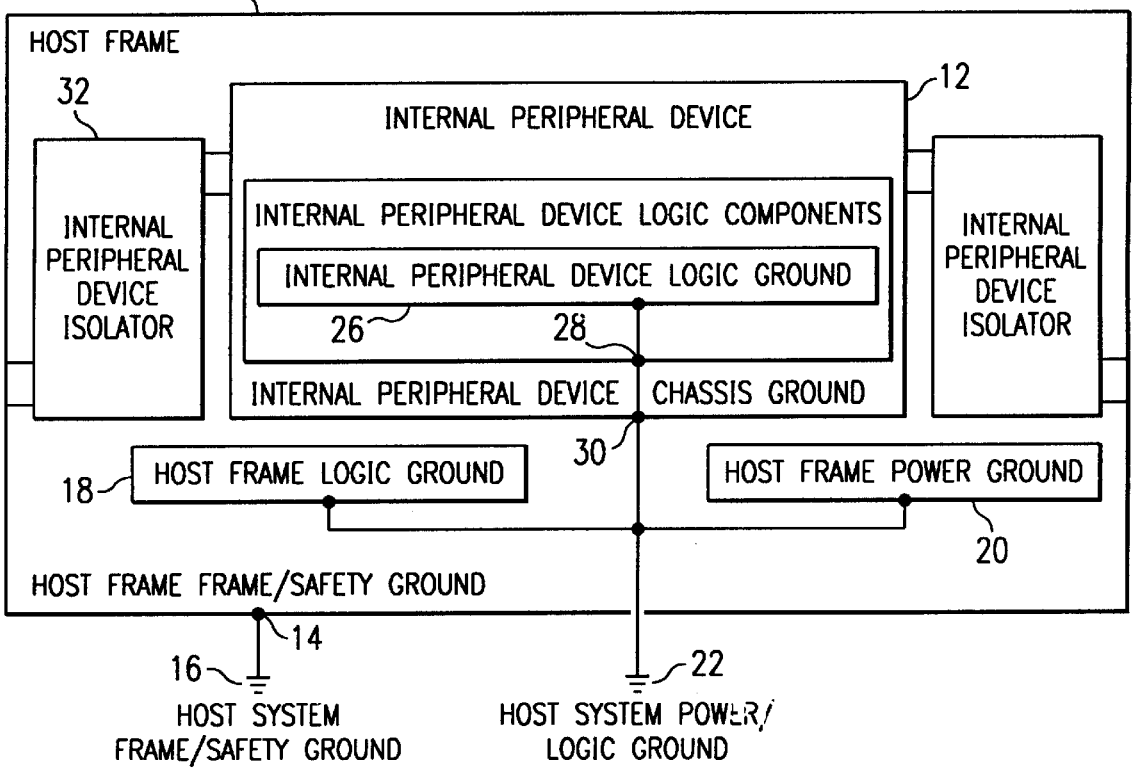
FIG. 2 is a block diagram illustrating an integrated ground configured host system frame with an integrated ground configured internal peripheral device.

Referring to FIGS. 1 and 2, a host system generally consists of one or more host frames 10. Each host frame 10 has various components and/or internal peripheral devices 12 included within. Host frame 10 is the unit in which all other components and/or internal peripheral devices 12 are housed. Each host frame 10 has a frame/safety ground 14 that is connected to a host system frame/safety ground 16.

Each host frame 10 will utilize one of two different ground configurations. The first ground configuration, shown in FIG. 1, has host frame 10 configured with an isolated ground, wherein a host frame logic ground 18 is separate from host frame frame/safety ground 14 and a host frame power ground 20. With this configuration, host frame logic ground 18 has a separate electrical signal path to a host system logic ground 22, host frame frame/safety ground 14 has a separate electrical signal path to host system frame/safety ground 16, and host frame power ground 20 has a separate electrical signal path to a host system power ground 24. Thus, none of individual host frame 10 grounds are interconnected to one another.

In the configuration of FIG. 2, host frame 10 is configured with an integrated ground, wherein host frame logic ground 18 and host frame power ground 20 are connected together but separated from host frame frame/safety ground 16. Thus, host frame logic ground 18 and host frame power ground 20 have the same electrical signal path to host system logic ground 22 and host system power ground 24. Host frame frame/safety ground 14 has a separate signal path to host system frame/safety ground 16.

Each internal peripheral device 12 will also utilize one of two different ground configurations. In a first ground configuration not shown, internal peripheral device 12 is configured with an isolated ground, wherein an internal peripheral device logic ground 26 is separate from an internal peripheral device chassis ground 28 and an internal peripheral device power ground 30. Thus, internal peripheral device logic ground 26, internal peripheral device chassis ground 28, and internal peripheral device power ground 30 have separate electrical signal paths and are not interconnected to one another.

For the configuration shown in FIGS. 1 and 2, internal peripheral device 12 is configured with an integrated ground, wherein internal peripheral device logic ground 26, internal peripheral device power ground 30, and internal peripheral device chassis ground 28 are connected together. Thus, internal peripheral device logic ground 26, internal peripheral device power ground 30, and internal peripheral device chassis ground 28 have the same electrical signal path and are interconnected.

Referring to FIGS. 1 and 2, internal peripheral device 12 configured with an integrated ground installed in host frame 10 configured with an isolated ground or integrated ground must have the chassis of internal peripheral device 12 isolated from host frame 10. Internal peripheral device 12 will have a single integrated internal peripheral device ground which encompasses power ground 30, logic ground 26, and chassis ground 28. For installation of internal peripheral device 12 into host frame 10 configured with an isolated ground as shown in FIG. 1, the single integrated internal peripheral device ground will be connected to host frame logic ground 18. For installation of the internal peripheral device into a host frame configured with an integrated ground as shown in FIG. 2, the single internal peripheral device ground will be connected to host frame logic ground 18 and host frame power ground 20. Since internal peripheral device 12 has a common power ground 30, logic ground 26, and chassis ground 28, host frame logic ground 18 and host frame frame/safety ground 14 would be interconnected if no internal peripheral device isolators or other non-conducting isolators are used, eliminating the separation of electrical signal paths.

Without the separation of host frame logic ground 18 and host frame frame/safety ground 14, a transient voltage spike on host frame 10 or internal peripheral device 12 may enter internal peripheral device 12, host frame 10, host system power ground 24, and/or host system logic ground 22, in response to the transient voltage spike following the path of least resistance to ground potential. The presence of a voltage spike on internal peripheral device 12, host frame 10, host system power ground 24, and/or host system logic ground 22 may result in an interruption of proper operation and/or damage to components located in these circuits.

The use of an internal peripheral device isolator 32, or other non-conducting isolators, maintains the separation of host frame power ground 20, host frame logic ground 18, and host frame frame/safety ground 14 when internal peripheral device 12 is attached to host frame 10. With isolation of internal peripheral device 12 maintaining separation of host frame power ground 20, host frame logic ground 18, and host frame frame/safety ground 14, a transient voltage spike on host frame 10 will be diverted to host system frame/safety ground 16. This will reduce the possibility of the transient voltage spike contaminating host frame 10, host system power ground 24, and/or host system logic ground 22.

By not using a non-conducting isolator to isolate internal peripheral device 12 from host frame frame/safety ground 14, a transient voltage spike on internal peripheral device 12 will cause the transient voltage spike to enter internal peripheral device 12, host frame 10, host system power ground 24 and/or host system logic ground 22 as the voltage spike follows the path of least resistance to ground potential. The presence of the transient voltage spike on internal peripheral device 12, host frame 10, host system power ground 24, and/or host system logic ground 22 may result in an interruption of proper operation and/or damage to components located in these circuits.

By using internal peripheral device isolator 32 to isolate internal peripheral device 12 from the host frame frame/safety ground 14, a transient voltage spike on internal peripheral device 12 will cause the transient voltage spike to be diverted through internal peripheral device isolator 32 to host system frame/safety ground 16 via the host frame frame/safety ground 14. This will reduce the possibility of the transient voltage spike contaminating host frame 10, host system power ground 24, and/or host system logic ground 22.

Figure 3:
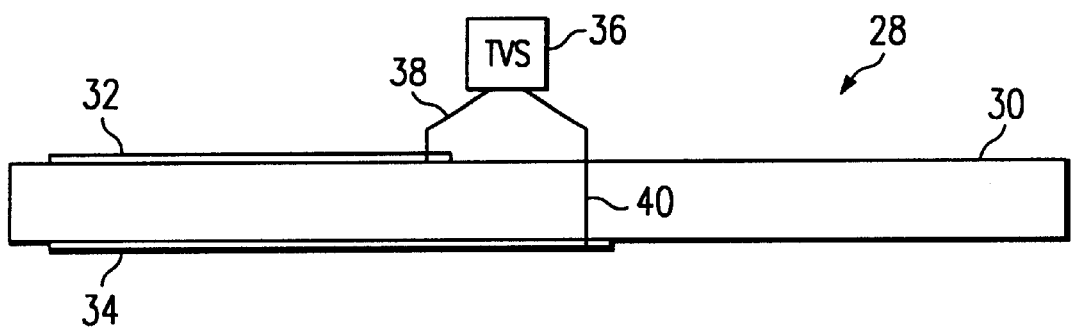
FIG. 3 is a side view of the peripheral device isolator.

FIG. 3 shows a peripheral device isolator 32. An insulating material 33 forms the base of peripheral device isolator 32. Insulating material 33 is preferably of a generally flat shape so that it has a distinct top and bottom surface. A first conductive area 34 is shown coupled to the top surface of insulating material 33. A second conductive area 35 is shown coupled to the bottom surface of insulating material 33. First conductive area 34 and second conductive area 35 may exist anywhere on opposite surfaces of insulating material 33. A transient voltage suppressor (TVS) 36 is mounted to first conductive area 34. TVS 36 is electrically coupled to first conductive area 34 by a first lead 38 and to second conductive area 35 by a second lead 40. Therefore, TVS 36 provides an electrical signal path between first conductive area 34 and second conductive area 35.

Figure 4:
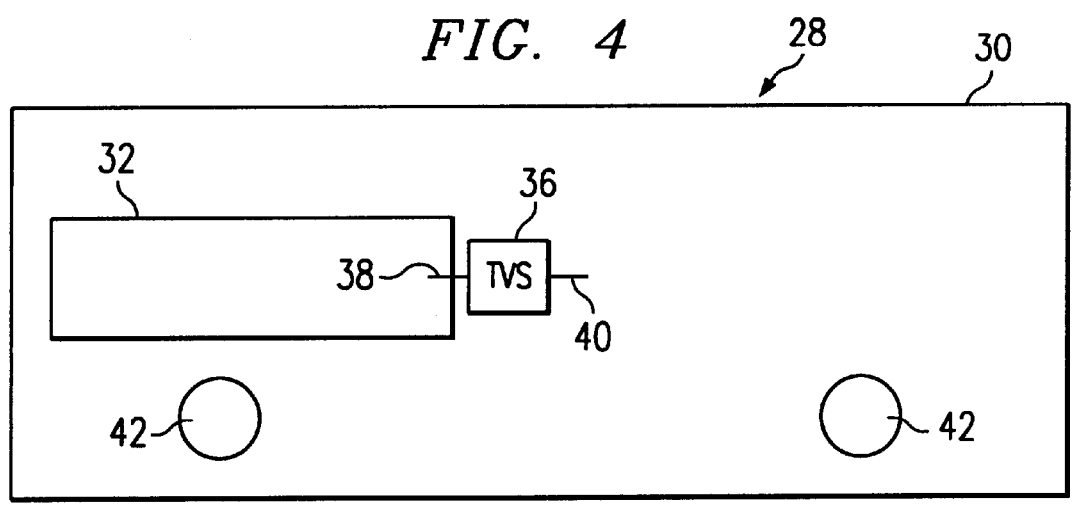
FIG. 4 is a top view of the peripheral device isolator.

Referring to FIG. 4, a top view of peripheral device isolator 32 is shown. First conductive area 34 may cover all or only a portion of the top surface of insulating material 33. First lead 38 couples TVS 36 to first conductive area 34. Second lead 40 couples TVS 36 to second conductive area 35 which is on the bottom surface of insulating material 33 and, therefore, not shown in FIG. 4. Second lead 40 passes through insulating material 33 to connect with second conductive area 35. Peripheral device isolator 32 is shown with two mounting holes 42. These holes may be used to secure peripheral device isolator 32 between host frame 10 and the chassis of peripheral device 22. Peripheral device isolator 32 is interposed between the chassis of internal peripheral device 12 and host frame 10 such that second conductive area 35 makes contact with the chassis of peripheral device 12 and first conductive area 34 makes contact with host frame 10, or vice versa. In this fashion, an electrical signal path between the chassis of peripheral device 12 and host frame 10 is created. Since host frame 10 is part of the host system frame, host frame 10 is connected to host system frame/safety ground 16. As previously discussed, internal peripheral device 12 may have an integrated logic and chassis ground that is connected to host system logic ground 22. The purpose of peripheral device isolator 32 is to divert a transient voltage occurring on the chassis of internal peripheral device 12 into host system frame/safety ground 16 via host frame frame/safety ground 14. Without peripheral device isolator 32, the transient voltage would locate a path to host system logic ground 22.

TVS 36 is normally in a non-conductive state. Thus, under normal circumstances, there is no electrical signal path between first conductive area 34 and second conductive area 35. If a voltage spike occurs on the chassis of internal peripheral device 12, TVS 36 should switch to a conductive state and provide an electrical signal path for the voltage spike to travel to host system frame/safety ground 16. TVS 36 is preferably a transient voltage suppressor which has a threshold voltage of just more than the voltage normally found on host system logic ground 22. Therefore, once a voltage is present on the chassis of internal peripheral device 12 which exceeds the voltage commonly found on host system logic ground 22, TVS 36 switches on to divert the voltage spike to host system frame/safety ground 16. By diverting the voltage spike, TVS 36 protects the logic components of internal peripheral device 12 and provides transient voltage immunity as required by NEBS. TVS 36 maintains the separation of host system logic ground 22 and host system frame/safety ground 16 since it switches off as soon as the voltage spike drops below the threshold voltage level.

For example, if the voltage level of the logic system of internal peripheral device 12 is between five and six volts, the threshold voltage for TVS 36 may be six volts. Selecting a threshold voltage close to the voltage level commonly found on host system logic ground 22 insures that most of the voltage spike will be diverted away from the internal peripheral device 12 logic system. In addition, peripheral device isolator 32 is preferably placed near the front of internal peripheral device 12 so that the voltage spike from the transient voltage is most likely to quickly locate the signal path through peripheral device isolator 32. The voltage capacity of TVS 36 may be on the order of 25,000 volts. The switching speed of TVS 36 should be a very high rate to insure that the majority of the voltage spike is diverted into host system frame/safety ground 16. The switching speed of TVS 36 is preferably on the order of one to two nanoseconds.

According to the teachings of the present invention, a peripheral device isolator is provided that diverts a voltage spike occurring on a chassis of a peripheral device having an integrated logic and chassis ground into a host system frame ground. The advantages of utilizing this peripheral device isolator include allowing a host system with separate logic, chassis, and frame grounds to use a peripheral device which has an integrated logic and chassis ground and still comply with the NEBS for transient voltage immunity.

Thus, it is apparent that there has been provided in accordance with the present invention a peripheral device isolator that satisfies the advantages set forth above. Although the present invention has been described in detail, it should be understood that various changes, substitutions, and alterations readily apparent to those skilled in the art may be made herein without departing from the spirit and the scope of the present invention as defined by the following claims.

What is claimed is:

1. A peripheral device isolator, comprising:
   an insulating material;
   a first conductive area on a first side of the insulating material;
   a second conductive area on a second side of the insulating material wherein the second side of the insulating material is opposite the first side;
   a transient voltage suppression device on the first side of the insulating material, the transient voltage suppression device coupled to the first and second conductive areas, the transient voltage suppression device coupled to the second conductive area through the insulating material, the transient voltage suppression device providing an electrical signal path between the first and second conductive areas.

2. The device of claim 1, wherein the transient voltage suppression device is operable to divert a voltage spike on a peripheral device in contact with one of the first and second conductive areas to prevent the voltage spike from entering logic components in a peripheral device or a host system.

3. The device of claim 2, wherein the voltage spike is caused by a transient surge on a chassis of the peripheral device.

4. The device of claim 1, wherein t he insulating material is a printed circuit board or other non-conducting material which provides spacing and insulating properties between the first and second conductive areas.

5. The device of claim 1, wherein the transient voltage suppression device is a transient voltage suppressor (TVS).

6. The device of claim 5, wherein the transient voltage suppressor (TVS) switches on at a high rate in response to sensing a voltage above a threshold voltage level.

7. The device of claim 6, wherein the transient voltage suppressor switches on at a rate of typically one to two nanoseconds.

8. A telecommunications system, comprising:
   a system frame with a system frame ground that is separate and isolated from a system logic ground;
   a peripheral device having a common chassis and logic ground, the peripheral device ground coupled to the system logic ground;
   a peripheral device isolator in direct physical contact with both the system frame and the peripheral device, the peripheral device isolator providing an electrical signal path between the peripheral device and the system frame so that a transient voltage spike on the peripheral device is diverted to the system frame ground to prevent the voltage spike from entering logic components in the peripheral device or the telecommunications host system, wherein the peripheral device isolator includes:
   an insulating material;

a first conductive area on a first side of the insulating material;

a second conductive area on a second side of the insulating material wherein the second side of the insulating material is opposite the first side;

a transient voltage suppression device on the first side of the insulating material, the transient voltage suppression device coupled to the first conductive area and coupled to the second conductive area through the insulating material, the transient voltage suppression device providing an electrical signal path between the first and second conductive areas.

9. The telecommunications system of claim 8, wherein one of the two conductive areas is in direct physical contact with the system frame and the other conductive area is in direct physical contact with the peripheral device.

10. The telecommunications system of claim 8, wherein the insulating material is a printed circuit board or other non-conducting material which provides spacing and insulating properties between the two conductive areas.

11. The telecommunications system of claim 8, wherein the first and second conductive areas are layers of metal covering a portion of the insulting material.

12. The telecommunications system of claim 8, wherein the transient voltage suppression device is a transient voltage suppressor (TVS).

13. The telecommunications system of claim 8, wherein the transient voltage suppression device has a threshold voltage level just above a voltage level of conventional logic components.

14. The telecommunications system of claim 8, wherein the transient voltage suppression device switches on at a high rate in response to sensing a voltage above a threshold voltage level.

* * * * *